United States Patent
Steinhauser et al.

(10) Patent No.: US 7,559,875 B2
(45) Date of Patent: Jul. 14, 2009

(54) METHOD FOR CONTROLLING THE SHIFT SEQUENCE OF A MULTISPEED AUTOMATIC TRANSMISSION IN A MOTOR VEHICLE

(75) Inventors: Klaus Steinhauser, Kressbronn (DE); Christian Popp, Kressbronn (DE)

(73) Assignee: ZF Friedrichshafen AG, Friedrichshafen (DE)

(*) Notice: Subject to any disclaimer, the term of this patent is extended or adjusted under 35 U.S.C. 154(b) by 419 days.

(21) Appl. No.: 11/591,121

(22) Filed: Nov. 1, 2006

(65) Prior Publication Data
US 2007/0105690 A1  May 10, 2007

(30) Foreign Application Priority Data
Nov. 5, 2005  (DE) ........................ 10 2005 052 824

(51) Int. Cl.
*G06F 7/00* (2006.01)
*G06F 17/00* (2006.01)
*F16H 59/60* (2006.01)
*F16H 59/62* (2006.01)
*F16H 61/00* (2006.01)

(52) U.S. Cl. ............................ 477/117; 477/97; 701/56
(58) Field of Classification Search .................. 477/117, 477/97, 70, 71; 701/54–56
See application file for complete search history.

(56) References Cited

U.S. PATENT DOCUMENTS

| | | | |
|---|---|---|---|
| 5,113,343 A | 5/1992 | Hunter et al. | |
| 6,066,071 A * | 5/2000 | Janecke et al. | 477/78 |
| 6,508,742 B2 | 1/2003 | Popp et al. | |
| 6,577,939 B1 | 6/2003 | Keyse et al. | |
| 6,623,397 B1 | 9/2003 | Raghavan et al. | |
| 6,832,976 B2 | 12/2004 | Nishida et al. | |
| 7,048,673 B2 * | 5/2006 | Shim et al. | 477/143 |
| 2003/0220170 A1 | 11/2003 | Nishida et al. | |
| 2005/0282680 A1 | 12/2005 | Soh | |
| 2006/0046892 A1 | 3/2006 | Bucknor et al. | |
| 2007/0129211 A1 | 6/2007 | Steinhauser et al. | |

FOREIGN PATENT DOCUMENTS

| | | |
|---|---|---|
| DE | 199 18 734 A1 | 11/2000 |
| DE | 199 28 674 A1 | 12/2000 |
| DE | 199 63 752 A1 | 7/2001 |
| DE | 100 35 479 A1 | 2/2002 |
| DE | 103 21 961 A1 | 2/2004 |
| DE | 103 38 624 A1 | 11/2004 |
| DE | 103 83 624 A1 | 11/2004 |
| DE | 103 30 153 A1 | 2/2005 |
| DE | 103 61 288 A1 | 7/2005 |
| DE | 10 2004 001 380 A1 | 8/2005 |
| DE | 10 2004 010 269 A1 | 9/2005 |
| DE | 10 2005 008 383 A1 | 9/2005 |
| DE | 10 2004 040 611 A1 | 3/2006 |
| DE | 10 2004 041 507 A1 | 3/2006 |
| DE | 10 2004 043 345 A1 | 3/2006 |
| EP | 1 219 868 A2 | 7/2002 |
| EP | 1 398 536 A2 | 3/2004 |
| EP | 1 533 543 A2 | 5/2005 |
| WO | WO-2004/097266 A1 | 11/2004 |
| WO | WO-2005/065981 A1 | 7/2005 |

* cited by examiner

*Primary Examiner*—Tisha D Lewis
(74) *Attorney, Agent, or Firm*—Davis & Bujold P.L.L.C.

(57) ABSTRACT

A method for controlling the shift sequence of a multispeed automatic gearbox in which, to reach a target gear called for, multiple shifts through one gear-step can be carried out. A target gear from a currently engaged gear is proposed and, which is several gear-steps away from this current gear, is engaged as a function of the current driving situation, optionally by a direct multiple shift in one step or by a combination of several successive single shifts each of only one gear-step or by a combination of several successive double or multiple shifts each of two or more than two gear-steps or by a combination of at least one double or multiple shift and at least one single shift or by a combination of at least one double shift and at least one multiple shift.

14 Claims, No Drawings

METHOD FOR CONTROLLING THE SHIFT SEQUENCE OF A MULTISPEED AUTOMATIC TRANSMISSION IN A MOTOR VEHICLE

The invention concerns a method for controlling the shift sequence of a multispeed automatic transmission in a motor vehicle.

The ever-increasing requirements set on the functionality of automatic transmissions due to the demand for greater spontaneity, the ever-increasing number of gear speeds to be engaged, the consumption-optimized design of automatic transmissions with larger proportions of driving in the high gears and the large number of downshifts to be carried out when the vehicle is braked to rest, make it necessary for the gear speeds of an automatic transmission to be shifted ever more rapidly and more frequently one after the other.

In the usual automatic transmissions, the shift elements are controlled electro-hydraulically in such a manner that, on the one hand, sensitive pressure regulation is possible during a shifting process while, on the other hand, when shifts are not taking place, operation at a constant pressure level is possible. Usually for this purpose, each shift element is associated with a shift valve and a pressure maintenance valve, the latter controlled by an electro-hydraulic pressure regulation valve. Correspondingly when shifts are not taking place, a closed shift element that is transmitting torque is acted upon by a constant holding pressure which is higher than the pressure level that would be necessary for the transmission of the actual torque. If now a shift is called for, the pressure on a shift element to be disengaged must first be reduced to below the pressure of the holding valve and can then be reduced further in a controlled way by the shift valve. Conversely, the beginning of the shift operation, the pressure space of a shift element to be engaged must, at first, be filled with pressure medium so that the piston of the shift element acted upon by the shifting pressure comes in contact with its disk pack and can then transmit torque. Usually, the filling process required for a shift element is divided into a rapid filling phase and a filling equalization phase. During the rapid filling phase, the shift element is filled with oil while, in contrast, the piston is applied with lower load during the filling equalization phase.

Both the reduction of pressure of a shift element to be disengaged during a shift operation to below the holding valve pressure, and the filling of a shift element to be engaged during a shifting operation, give rise during the gearshift operation to undesired delay times in which the speed change to the next ratio step does not yet even begin, or in which the speed change to the next ratio step does not take place continuously, but rather remains at the synchronous speed of the previous gear. To increase the shift speed of automatic transmissions, it is therefore proposed, for example in DE 100 35 479 A1, that during every shift operation the shift element which has to be engaged or disengaged for a subsequent shift in the same direction, i.e., the shift element which has to be engaged or disengaged for a second upshift after a first upshift or for a second downshift after a first downshift, should already be prepared in terms of pressure for the subsequent shift during the first shift, i.e., filled or reduced to shifting pressure already during the first shift. In this way, the later shift can follow the first shift immediately and without delay as soon as the synchronous speed of the target gear of the first shift has been reached.

The purpose of the present invention is to indicate a method for controlling the shift sequence of a multispeed automatic transmission in a motor vehicle, which optimizes the shift sequences required when a particular current gear is engaged and, starting from this current gear, a target gear several gear steps away from it is to be reached, on the one hand, in relation to a desired comfort level and, on the other hand, in relation to the shortest possible reaction time.

This objective is achieved by a method having the characteristics of claim 1. Further advantageous design features emerge from the subordinate claims.

The invention is based on a method for controlling the shift sequence of a multispeed automatic transmission of a motor vehicle, in which, to reach a required target gear, multiple shifts through more than one gear-step can be carried out. According to the invention, it is proposed that when a current gear is engaged and, starting from that current gear, a target gear several steps away is called for then, depending on the driving situation at the time, the target gear is engaged, optionally:

in a direct, one-step shift,
or by a combination of several successive single shifts, in each case from one gear to the next gear in the direction of the target gear,
or by a combination of successive double shifts each through two gears,
or by a successive combination of at least one double shift and at least one single shift,
or by a combination of several successive multiple shifts one after another, each through more than two gears,
or by a successive combination of at least one multiple shift and at least one single shift,
or by a successive combination of at least one multiple shift and at least one double shift.

When it is recognized that a target gear called for is more than one transmission-specific gear further away from the currently engaged gear of the automatic transmission and, in a known way, it can be called for manually by a driver of the motor vehicle or by an electronic transmission control unit with reference to predefined or adaptively learning gear selection logic ("driving strategy"), the shift sequence required to reach the target gear in the automatic transmission is advantageously selected as a function of the current driving situation and the target gear is engaged by way of operating sequences of a shift element control system of the automatic transmission which acts upon the shift elements involved in the respective shift. The sequences are influenced or variable as a function of the driving situation.

Preferably in doing this, all the relevant control algorithms, such as the pressure control or pressure regulation of one or more shift elements of the automatic transmission which are to be engaged, the pressure control or regulation of one or more shift elements of the automatic transmission which are to be disengaged, shift interruption algorithms, pressure and time adaptations of the shift control and influencing of the torque to be engaged or, an engine intervention on the engine driving the automatic transmission, are selected in a manner related to the driving situation or as a function of the current driving situation in such a way that the target gear called for is reached in a manner which, on the one hand, corresponds as exactly as possible to the actual expectations of the driver of the motor vehicle and, on the other hand, also takes into account all the relevant safety aspects for the automatic transmission itself and for the driving behavior of the motor vehicle in an optimum way.

Preferably for this, the control or regulation parameters of the pressure acting on the automatic transmission's shift elements involved in each case, the influencing of the torque and/or the adaptation functions of the shift sequence selected in relation to driving situation for reaching the target gear, are chosen as a function of the driving situation at the time. If the required change from the currently engaged gear to the target gear is carried out as a multiple shift in a single step then, starting from the shift element combination engaged for the current gear in accordance with the shift logic of the automatic transmission, the change is made directly to the shift element combination which corresponds to the target gear. In contrast, if the required change from the current gear to the target gear is carried out as a combination of successive double or multiple shifts or as a combination of successive double or multiple shifts and single shifts then, starting from the shift element combination engaged for the current gear in accordance with the shift logic of the automatic transmission, the corresponding "intermediate gears" are engaged first, and only after the last of these "intermediate gears" are the shift elements corresponding to the target gear engaged.

For these purposes the current driving situation can be defined in terms, for example, of one or more of the following parameters:

detected current driver type,
    detected current sportiness or detected current driving style of the driver of the motor vehicle,
    current active shift program (economical, sporty, winter) of the automatic transmission,
    current active operating mode (automatic operation, manual gear selection) of the automatic transmission,
    currently engaged gear from which the target gear has been called for,
    difference or distance between the current and the target gears,
    current driving speed of current drive output speed of the automatic transmission,
    current driving resistance of the vehicle,
    current vehicle weight,
    trailer operation,
    current engine speed,
    current transmission input speed,
    current accelerator pedal position,
    accelerator pedal stroke leading to the call for the target gear,
    accelerator pedal speed leading to the call for the target gear,
    current transmission temperature,
    current engine temperature,
    current active replacement function of the automatic transmission.

The specification of the target gear can be influenced, in principle, by various current environmental conditions and (as already said) can take place, for example, by virtue of the driving strategy of the automatic transmission when pre-defined operating parameters of the vehicle or the automatic transmission are reached. Known selection criteria are, for example, fixed predefined shift characteristics, but also shift characteristics that can be adaptively modified as a function of driving behavior or driver activity or sportiness and/or driving situation or conditions in the vehicle's environment. For example, if the driver of the motor vehicle prefers an economical driving mode which minimizes fuel consumption, then, when the option for it is provided for, this is specified manually by way of a corresponding shift program ("E-program") or set by an "intelligent" driving strategy which recognizes his driving style. For economical, fuel consumption orientated driving, it is unnecessary, when an upshift is called for, to engage all the individual gears between the current gear and a target gear more than one gear-step away from that current gear one by one and in sequence, in order to reach the maximum drive performance constantly during the shift or, in the event of a premature interruption of the upshift, to constantly maintain the maximum driving performance. According to the invention, in such a case, it can advantageously be provided, for example, that the upshift called for through more than one gear step can be carried out as just a single upshift directly to the target gear whereby, on the one hand, the number of shifts is reduced and on the other hand the drive engine of the vehicle connected to the automatic transmission operates at the lowest possible speed, both these being in accordance with the driver's wish for economical and more comfort-orientated driving operation.

Otherwise than for an upshift, when an economical and fuel-consumption, minimizing driving mode has been specified or identified, it is unnecessarily appropriate to carry out a downshift that has been called for through more than one gear-step as just a single shift directly from the currently engaged gear to the target gear because, in some circumstances, this would lead to racing of the drive engine or to a very rapid provision of the increased drive power, neither of which the economical driver would wish for. According to the invention, in this case, it can advantageously be provided, for example, that the downshift called for is carried out from the current gear as a combination of successive single downshifts (each by only one gear-step) until the target gear has been reached. If the difference between the gear currently engaged in the automatic transmission at the time of the shift command and the target gear of the downshift called for is large enough, it can also be provided that the target gear is not engaged exclusively by a combination of successive single downshifts in each case from one gear to the next gear in the direction of the target gear, but by a combination of multiple or double downshifts or by a combination of at least one multiple or double downshift and at least one single downshift, or by a combination of at least one multiple or double downshift with at least one double downshift.

In contrast, if the driver of the motor vehicle prefers a sporty, drive-performance-orientated driving mode, then this too—provided that the option for it is available—can be specified manually by way of a corresponding shift program ("S-program") or set by an "intelligent" driving strategy which recognizes his driving style. Otherwise than for an economical, comfort-orientated, driving mode, for a sporty, drive-performance-orientated driving mode, it is appropriate to allow an upshift to a target gear more than one gear-step away from the gear currently engaged at the time of the shift command to take place in gear-steps as close together as possible, so that at all times during the shifting process, the maximum drive power is always maintained or, if the upshift is interrupted prematurely, the maximum drive power can always be attained. According to the invention, in this case, it can advantageously be provided that the upshift called for is carried out from the currently engaged gear as a combination of successive single upshifts (each by one gear-step) until the target gear has been reached. If the difference between the gear currently engaged in the automatic transmission at the time of the shift command and the upshift target gear called for is large enough, it can also be provided that the target gear is not engaged exclusively by a combination of successive single upshifts in each case from one gear to the next gear in the direction of the target gear, but by a combination of multiple or double upshifts or by a combination of at least one multiple or double upshift and at least one single upshift, or by a combination of at least one multiple or double upshift and at least one double upshift.

Otherwise than for upshifting, if the driving mode has been specified or identified as sporty and drive-performance-orientated, it is desirable to carry out a downshift called for over more than one gear-step as just one shift directly from the current gear to the target gear, in order to achieve the highest possible drive power and obtain the most spontaneous possible shifting behavior of the automatic transmission. According to the invention, this too is advantageously possible. Naturally, it is also possible during this, for example depending on the actual sportiness or the actual driving activity, to engage the target gear by a combination of successive multiple or double downshifts or by a combination of multiple and double downshifts or by a combination of single downshifts with double or multiple downshifts, in particular when the difference between the current and target gears is large.

Otherwise than when the driving mode of the driver is deliberately sporty, heavy loading of the vehicle or driving with a trailer can also lead to operation of the automatic transmission in a shift program with comparatively high shift speeds, in order to sufficiently compensate the displacement of the driving resistance characteristic of the motor vehicle compared with "normal operation". To ensure the greatest possible driving stability, in this case according to the invention, it can be provided that both an upshift and a downshift called for to a target gear more than one gear-step away from the current gear at the time of the shift command, is carried out from the current gear as a combination of successive single shifts, each by one gear-step, until the target gear has been reached.

In an activated winter program of the automatic transmission and also when the driving strategy of the automatic transmission recognizes an unstable driving condition of the vehicle, such as spinning of the drive wheels, skidding or a tendency of the vehicle to skid, for example, it can be provided that all the shifts called for to a target gear more than one gear-step away from the gear currently engaged at the time of the shift command, are carried out from the current gear as a combination of successive single shifts each by one gear-step until the target gear has been reached.

For those with knowledge of the subject, it is easy to understand that for both upshifts and downshifts covering more than one gear-step, the advantage obtained by the driving-situation-sensitive selection of the shift sequence corresponding to the invention becomes larger as the number of gears in the automatic transmission increases. Such persons can also understand that the advantage obtained by the driving-situation-sensitive selection of the shift sequence, according to the invention, becomes larger as the total gear difference to be shifted through from the current to the target gear increases.

In a particularly advantageous manner according to the invention, the method enables a perfect adaptation of the gear transitions from a currently engaged gear to all possible target gears called for, in each case to the actual operating and environmental conditions of the vehicle and to the respective needs and expectations of the driver. However, according to the invention, the method also increases the intervention options during a shifting process in progress by the driving-situation, optimized selection of the intermediate gears until the target gear is reached so that a shift interruption can be commanded manually by the driver via a selector device and also called for automatically by the driving strategy of the automatic transmission, because of a driver reaction (such as accelerator pedal movement) or a sudden change of an environment condition (such as spinning of the drive wheels, a tendency to skid, black ice alarm, distance radar alarm).

In addition, according to the invention, the method maximizes the availability of the motor vehicle. Thanks to the possibility, during shift operations that cover more than one gear-step, of deliberately missing out temporarily or even permanently individual gears of the automatic transmission whose shift elements are affected by problems at the time or which cannot be engaged in the normal way, or even which are defective, effective protection of the transmission is achieved without undue restriction of the operating range of the vehicle.

The invention claimed is:

1. A method of controlling a shift sequence of a multispeed automatic transmission of a vehicle to reach a target gear from a current gear, the shift sequence requiring multiple shifts of more than one gear-step, the method comprising the steps of:
    determining the shifting sequence from one of the following sequences when starting from the current gear, depending on a driving situation at a time the target gear is engaged, the sequences including:
    a direct, one-step shift;
    a combination of several successive single shifts, in each case from one gear to a next gear in a direction of the target gear;
    a combination of successive double shifts each through two gears;
    a successive combination of at least one double shift and at least one single shift;
    a combination of several successive multiple shifts, each through more than two gears;
    a successive combination of at least one multiple shift and at least one single shift;
    a successive combination of at least one multiple shift and at least one double shift; and
    carrying out one of an upshift and a downshift, to reach a target gear differing by more than one gear-step from the current gear at a time of a shift command, the one of the upshift and downshift starting from the currently encaged gear comprises a combination of successive single shifts each of only one gear-step until the target gear has been reached, when by virtue of a driving strategy of the automatic transmission an unstable driving condition of the vehicle is recognized or when high driving stability is one of recognized by virtue of the driving strategy as a driver's wish or specified by the driver of the vehicle.

2. The method according to claim 1, further comprising the steps of running pressure control algorithms required for reaching the target gear, the pressure control algorithms controlling pressure to one or more shift elements of the automatic transmission which are to be one of engaged or disengaged;
    selecting one or more of shift interruption algorithms, pressure and time adaptations of the shift control and influencing of torque or an engine intervention on an engine driving the automatic transmission, as a function of a current driving situation in such a way that the target gear is reached in a manner which corresponds to a current driving style of a driver and takes into account all relevant safety aspects for the automatic transmission and for a driving behavior of the vehicle.

3. The method according to claim 1, further comprising the step of selecting one or more parameters of a pressure control and regulation, influencing of the torque or an engine intervention and an adaptation function of the shift sequence for reaching the target gear, as a function of a current driving situation.

4. The method according to claim 1, further comprising the step of defining a current driving situation in terms of one or more of the following parameters:
    detected current driver type,
    detected current sportiness or detected current driving style of the driver of the motor vehicle, current active shift program (economical, sporty, winter) of the automatic transmission,
current active operating mode (automatic operation, manual gear selection) of the automatic transmission,
currently engaged gear from which the target gear has been called for,
one of difference or distance between the current and target gears,
current driving speed or current drive output speed of the automatic transmission,
current driving resistance of the vehicle,
current vehicle weight,
trailer operation,
current engine speed,
current transmission speed,
current accelerator pedal position,
accelerator pedal stroke leading to the call for the target gear,
accelerator pedal speed leading to the call for the target gear,
current transmission temperature,
current engine temperature,
current active replacement function of the automatic transmission.

5. The method according to claim 1, further comprising the step of passing over gears of the automatic transmission during a shifting through of more than one gear-step, the gears having shift elements that cannot currently be engaged in a normal manner.

6. The method according to claim 1, further comprising the step of carrying out an upshift to a target gear differing by more than one gear-step from the current gear engaged at a time of a shift command, the upshift being a single upshift from the current gear, when economical, fuel-consumption-saving operation of the automatic transmission is one of recognized by virtue of a driving strategy of the automatic transmission as one of a driver's wish or when specified by the driver of the vehicle.

7. The method according to claim 1, further comprising the step of carrying out an upshift to a target gear differing by more than one gear-step from the current gear at a time of a shift command, the upshift being a combination of at least one double or multiple upshift and at least one single, double or multiple upshift, when economical, fuel-consumption-saving operation of the automatic transmission is one of recognized by virtue of a driving strategy of the automatic transmission as a driver's wish or when specified by the driver of the vehicle.

8. The method according to claim 1, further comprising the step of carrying out a downshift to a target gear differing by more than one gear-step from the current gear at a time of a shift command, the downshift, starting from the current gear, being a combination of successive single downshifts each of only one gear-step until the target gear has been reached, when economical, fuel-consumption-saving operation of the automatic transmission is one of recognized by virtue of a driving strategy of the automatic transmission as a driver's wish or when specified by the driver of the vehicle.

9. The method according to claim 1, further comprising the step of carrying out a downshift to a target gear differing by more than one gear-step from the current gear at a time of a shift command, the downshift comprising a combination of at least one double or multiple downshift and at least one single, double or multiple downshift, when economical, fuel-consumption-saving operation of the automatic transmission is one of recognized by virtue of a driving strategy of the automatic transmission as a driver's wish or when specified by a driver of the vehicle.

10. A method of controlling a shift sequence of a multi-speed automatic transmission of a vehicle to reach a target gear from a current gear, the shift sequence requiring multiple shifts of more than one gear-step, the method comprising the steps of:
determining the shifting sequence from one of the following sequences when starting from the current gear, depending on a driving situation at a time the target gear is engaged, the sequences including:
a direct, one-step shift;
a combination of several successive single shifts, in each case from one gear to a next gear in a direction of the target gear;
a combination of successive double shifts each through two gears;
a successive combination of at least one double shift and at least one single shift;
a combination of several successive multiple shifts, each through more than two gears;
a successive combination of at least one multiple shift and at least one single shift; and
a successive combination of at least one multiple shift and at least one double shift; and
carrying out an upshift to a target gear differing by more than one gear-step from the current gear at a time of a shift command, the upshift, starting from the current gear, being as a combination of successive single upshifts each of only one gear-step until the target gear has been reached, when sporty, driving-performance-orientated operation of the automatic transmission is one of recognized by virtue of a driving strategy of the automatic transmission as the driver's wish or when specified by a driver of the vehicle.

11. The method according to claim 1, further comprising the step of carrying out an upshift to a target gear differing by more than one gear-step from a gear currently engaged at a time of a shift command, the upshift being a combination of at least one double or multiple upshift and at least one single, double or multiple upshift, when sporty, driving-performance-orientated operation of the automatic transmission is one of recognized by virtue of a driving strategy of the automatic transmission as the driver's wish or when specified by the driver of the vehicle.

12. The method according to claim 1, further comprising the step of carrying out a downshift to a target gear differing by more than one gear-step from a gear currently engaged at a time of a shift command, the downshift starting from the current gear as a single downshift directly to the target gear, when sporty, driving-performance-orientated operation of the automatic transmission is one of recognized by virtue of a driving strategy of the automatic transmission as a driver's wish or when specified by the driver of the vehicle.

13. The method according to claim 1, wherein carrying out a downshift to a target gear differing by more than one gear-step from the current gear engaged at a time of a shift command, the downshift being a combination of at least one double or multiple downshift and at least one single, double or multiple downshift, when sporty, driving-performance-orientated operation of the automatic transmission is one of recognized by virtue of a driving strategy of the automatic transmission as a driver's wish or when specified by the driver of the vehicle.

14. A method of controlling a shift sequence of a multi-speed automatic transmission of a vehicle to reach a target gear from a current gear, the shift sequence requiring multiple shifts of more than one gear-step, the method comprising the steps of:

determining the shifting sequence from one of the following sequences when starting from the current gear, depending on a driving situation at a time the target gear is engaged, the sequences including:

a direct, one-step shift;

a combination of several successive single shifts, in each case from one gear to a next gear in a direction of the target gear;

a combination of successive double shifts each through two gears;

a successive combination of at least one double shift and at least one single shift;

a combination of several successive multiple shifts, each through more than two gears;

a successive combination of at least one multiple shift and at least one single shift; and a successive combination of at least one multiple shift and at least one double shift;

carrying out one of an upshift and a downshift, to reach a target gear differing by more than one gear-step from the current gear at a time of a shift command, the one of the upshift and downshift starting from the currently engaged gear comprises a combination of successive single shifts each of only one gear-step until the target gear has been reached, when by virtue of a driving strategy of the automatic transmission an unstable driving condition of the vehicle is recognized or when high driving stability is one of recognized by virtue of the driving strategy as a driver's wish or specified by the driver of the vehicle; and passing over gears of the automatic transmission, during a shifting through more than one gear-step, which have shift elements that cannot currently be engaged in a normal manner.

\* \* \* \* \*